No. 686,755. Patented Nov. 19, 1901.
C. H. PALMER & C. FENTON.
MACHINE FOR MAKING INSULATING TUBES.
(Application filed June 15, 1901.)
(No Model.) 2 Sheets—Sheet 2.
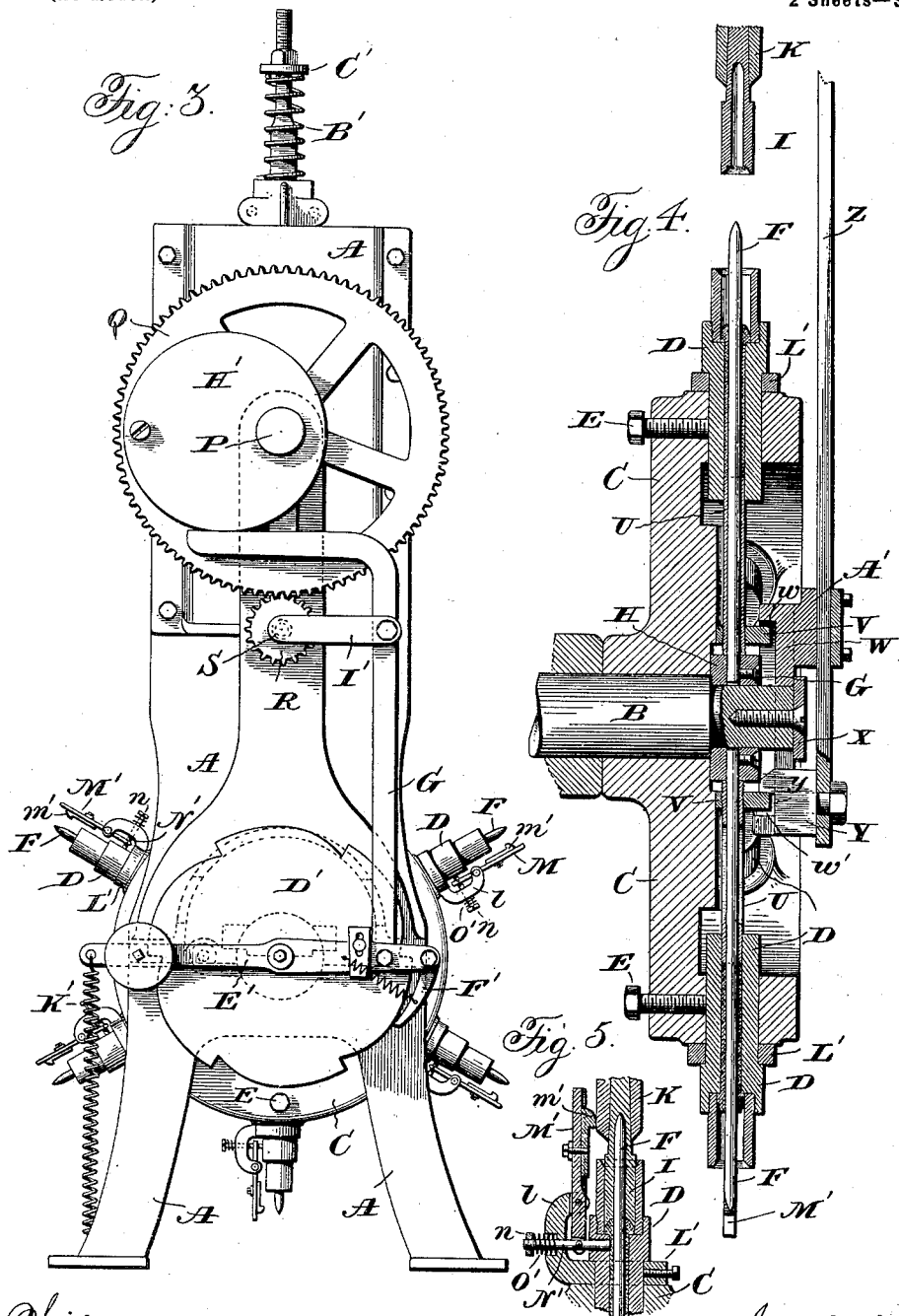

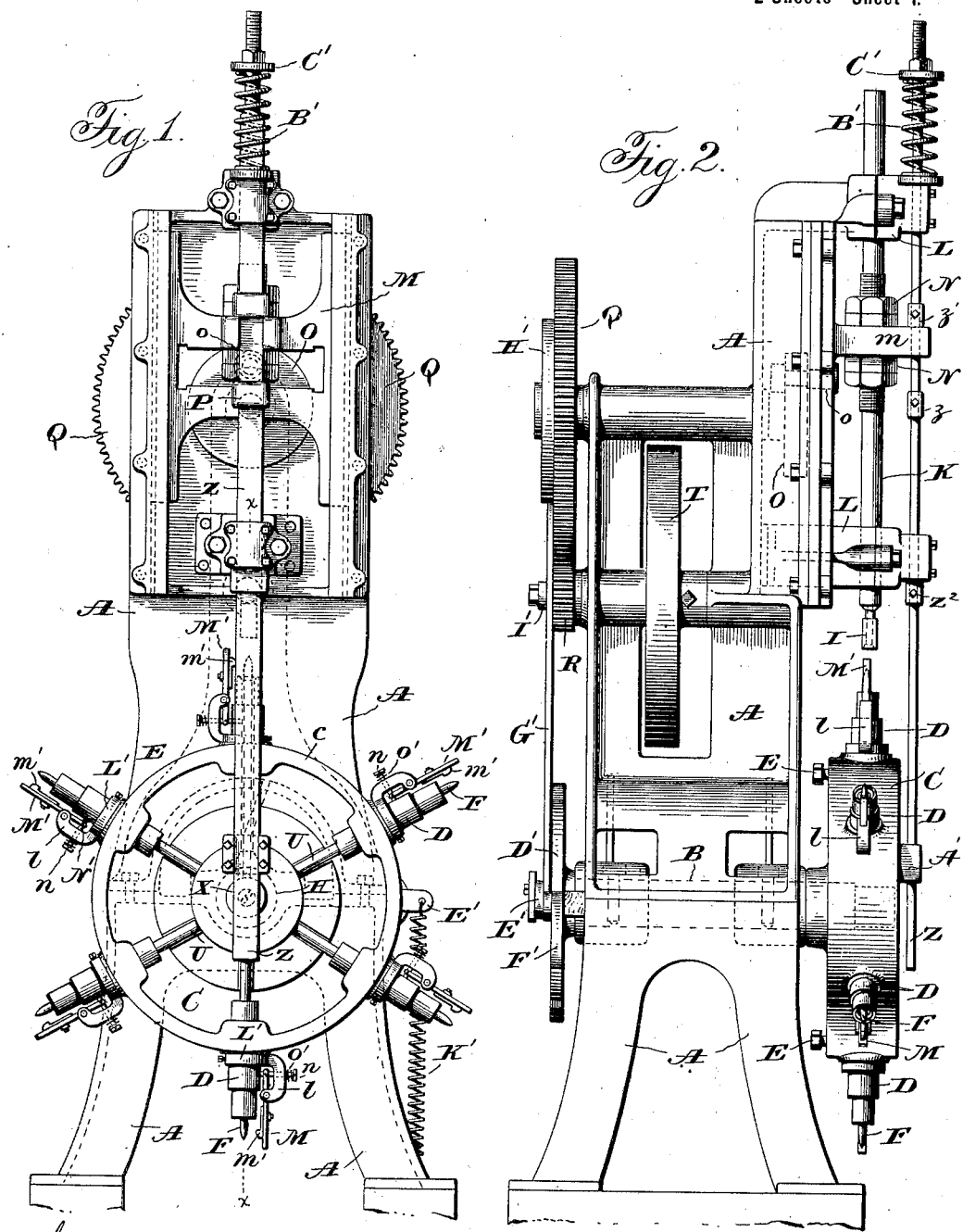

UNITED STATES PATENT OFFICE.

CHARLES H. PALMER, OF AKRON, AND CURTIS FENTON, OF MOGADORE, OHIO.

MACHINE FOR MAKING INSULATING-TUBES.

SPECIFICATION forming part of Letters Patent No. 686,755, dated November 19, 1901.

Application filed June 15, 1901. Serial No. 64,736. (No model.)

*To all whom it may concern:*

Be it known that we, CHARLES H. PALMER, of Akron, and CURTIS FENTON, of Mogadore, in the county of Summit, and in the State of Ohio, have invented certain new and useful Improvements in Machines for Making Insulating-Tubes; and we do hereby declare that the following is a full, clear, and exact description thereof, reference being had to the accompanying drawings, in which—

Figure 1 is a front elevation of a tube-machine embodying our invention; Fig. 2, a side elevation thereof; Fig. 3, a rear elevation of said machine, and Fig. 4 a detail view in section on the line $x\,x$ of Fig. 1.

Letters of like name and kind refer to like parts in each of the figures.

The object of our invention is to provide an efficient machine for making tubes of clay or other plastic material; and to this end said invention consists in the machine and the parts thereof, substantially as hereinafter specified.

In the building of the machine illustrated there is employed a metal frame A, in bearings on which is journaled a horizontal shaft B, on the end of which—that is, at the front of the machine—is a head C. The latter is in the form of a disk having a peripheral rim or flange $c$, in which is a series of radial holes, each adapted for the reception of the shank of one of a series of radially-extending tube molds or formers D and D. A screw E, passing through the head and impinging against the mold-shank, secures each mold to the head. Each mold or former is perforated longitudinally by a hole, one portion of which is of the diameter of the body or main portion of the tube to be made, and the remaining portion, which is the outer portion, has a greater diameter, the latter being that of a head or enlargement on the tube.

Concentric with and passing through each mold or former is a rod or spindle F, whose diameter is the same as the internal diameter of the tube to be made, its outer end being tapering or sharp and at its inner end being secured by a screw G in a radial opening in a collar H on the head-carrying shaft B.

Adapted to coöperate with each of the molds in turn is a plunger I, carried on the lower end of a vertically-reciprocating rod K, said plunger being hollow to enable it to pass over the rods or spindles F and F and having its lower end recessed to form a matrix for the formation of the head or enlargement of the tube to be made. The rod K is guided near top and bottom by brackets L and L, projecting from the frame A, and at its mid-length it is secured to a horizontal arm $m$ on a slide M, mounted in vertical ways on the frame A. The connection between the rod and the arm is such as to permit vertical adjustment of the rod, and, as shown, such connection comprises nuts N and N on a threaded portion of the rod on opposite sides of the arm. For reciprocating the slide it is formed with a horizontally-extending slot that is engaged by the wrist-pin $o$ of a crank-disk O on a shaft P. To revolve the latter, it has a gear-wheel Q, that meshes with a pinion R on a shaft S, on which is a drive or band wheel T.

Mounted on each rod or spindle F is a tube U, having an external diameter to fit the smaller portion of the mold-hole and normally in a position with its outer end projecting a short distance into said hole and forming the bottom of the mold and its inner end engaging the periphery of the collar H. Near its inner end there is attached to the tube U a block V, one end of which engages a radial groove in the face of the disk portion of the rotary head C and the other end of which enters a circular cavity or groove $w$ in the inner face of a plate W, mounted loosely on the shaft B, being held thereon by a cap X on the end of the shaft. At a point diametrically opposite the tube U of the mold that is in position to coöperate with the plunger I the circular groove $w$ is intersected by an outwardly-extending radial slot $w'$, in which is a sliding block Y, having a notch $y$ to coincide with said groove $w$, so that a block V may move from the groove into engagement with said notch, and the block and its tube U made to move with the block Y and so that such block V may move from the notch into the groove. The block Y is secured to the lower end of a rod or bar Z, that passes through a guide-block A' on the plate W and through guides in the two brackets L and L, and above the upper bracket L is encircled by a coiled spring B', that engages a collar C' thereon and normally holds the rod in its lifted position, with the block-notch $y$ in coincidence with the groove $w$. The bar Z also passes through the slide-arm $m$ and below the latter has a collar $z$, that on the descent of the slide is engaged by the arm $m$ and the bar thereby moved downward. Preferably a collar $z'$ is placed on the bar above the arm $m$ to insure the prompt lifting of the bar, and a stop-collar $z^2$ is used on the bar to engage the lower bracket L when the bar has been lifted to place the notch $y$ and groove $w$ in alinement. The connection of the plate W with the bar Z by means of the guide A' and the block Y prevents the turning of said plate on the shaft B.

The mold-carrying head C is rotated step by step or intermittently, and for this purpose a ratchet-wheel D' is fixed on the shaft B, having teeth agreeing in number with the number of the molds, and pivoted on the shaft B is a lever E', to one end of which is pivoted a pawl F'. The lever is swung to move the ratchet-wheel by a rod or bar G', which is pivotally attached to the lever at its lower end and has its upper end extended horizontally for engagement by an eccentric-form cam H' on the shaft P. Said rod or bar G' is supported near its upper end by an arm I', pivoted on the end of the shaft S. A spring K', attached at one end to the lever and at its other end to the frame A, moves the lever in the reverse direction. Brake-blocks of wood insure the stopping of the ratchet-wheel.

Secured to each mold D is a collar L', having an arm or extension $l$, to which is pivoted a lever M', that stands parallel with the mold-axis, and at one end is pivoted to a bar N', that passes through a radial opening in the mold and carries or has on its end means for indenting the tube to form thereon a trademark or other device. A cam-surface $m'$ is on or attached to the lever M' in position to be engaged by the lower end of the plunger-carrying rod K, so that on the descent of the latter the lever will be swung to move the bar N' inward to impress its device on the tube, while to retract said bar a coiled spring O' is placed thereon between the arm $l$ and a collar $n$ on the bar.

The operation of our machine is briefly as follows: While the mold-carrying head C is at rest the operator places a tube of clay in that mold D which on the first movement of the head is placed opposite the plunger I. The head C being then revolved one step to place the mold with the tube in line with the plunger I, the latter by the descent of the slide M enters the mold, and pressing the tube makes the head thereon and causes it to accurately take the finished form of the mold. By the action of the bar N produced by the engagement of the lever M' with the rod K the device carried by the bar is imprinted on the still soft or plastic tube. Simultaneously with the pressing of a tube a tube previously operated on is expelled from the diametrically opposite mold D by the outward movement of the tube U caused by the engagement with its block V of the block Y, to which movement is imparted from the slide by the mechanism hereinbefore described.

Though we prefer to embody our invention in a machine having the construction of parts shown and described, it is to be understood that machines may be made having the parts differently constructed which will also embody our invention.

Having thus described our invention, what we claim is—

1. In a tube-forming machine, the combination of a series of molds, containing each a spindle, and a plunger that coöperates with the molds in succession, substantially as and for the purpose described.

2. In a tube-forming machine, the combination of a traveling series of molds, containing each a spindle, and a plunger that coöperates with the molds and to and from the position for coöperating with which they are moved, substantially as and for the purpose described.

3. In a tube-forming machine, the combination of a rotary head, a series of molds, containing each a spindle, mounted on said head, a plunger that coöperates with the molds, and means for rotating the head step by step, substantially as and for the purpose described.

4. In a tube-forming machine, the combination of a series of molds, a plunger movable into and out of each of the molds, a tube-ejector for each mold, and means for simultaneously operating the plunger and a tube-ejector, substantially as and for the purpose described.

5. In a tube-forming machine, the combination of a rotary head, a series of molds containing each a spindle, mounted on said head, a plunger that coöperates with the molds, a tube-ejector for each mold, and means for simultaneously operating the plunger and a tube-ejector, substantially as and for the purpose described.

6. In a tube-forming machine, the combination of a rotary head, a series of molds having each a spindle, mounted on said head, a plunger that coöperates with the molds, and a tube-ejector for each mold, slidingly mounted on the spindle thereof, substantially as and for the purpose described.

7. In a tube-forming machine, the combination of a rotary mold-carrying head, an ejector for each mold, a plate having a circular groove to engage a part on the ejector and an ejector-operating block having a notch to engage the groove-engaging part of the ejector, substantially as and for the purpose described.

8. In a tube-forming machine, the combination of a rotary, mold-carrying head, a plunger, an ejector for each mold, an ejector-operating device, a reciprocating slide, and connections between the slide and both the plunger and the ejector-operating device, substantially as and for the purpose described.

9. In a tube-forming machine, the combination of a rotary, mold-carrying head, a plunger, an ejector for each mold, an ejector-operating device, a reciprocating slide, an arm on the latter, connections between said arm and the plunger, and means whereby said arm actuates the ejector-operating device, substantially as and for the purpose described.

10. In a tube-forming machine, the combination of a rotary, mold-carrying head, a shaft therefor, a plunger, an ejector for each mold, a plate loose on the shaft having a circular groove to engage a part on the ejector, an ejector-operating block having a notch to engage the groove-engaging part of the ejector, a bar to which said block is attached, a guide for the bar on said plate, and a slide for operating both the plunger and said bar, substantially as and for the purpose described.

11. In a machine for forming tubes or other articles, the combination of a series of molds, a plunger that coöperates with the molds in succession, and a tool passing into each mold adapted to be actuated by the plunger, but unconnected therewith, substantially as and for the purpose described.

12. In a machine for forming tubes or other articles, the combination of a rotary head, a series of molds mounted on said head, a plunger that coöperates with the molds in succession, a tool for each mold that passes therein, and plunger-operated means for actuating said tool unconnected with the plunger, substantially as described.

13. In a machine for forming tubes or other articles, the combination of a mold, a plunger, a tool passing into the mold, a lever connected to the tool and having a part in the path of the plunger and adapted to be moved thereby to operate said tool, substantially as and for the purpose described.

14. In a machine for forming tubes or other articles, the combination of a mold, a bar passing into the latter, a lever connected with the bar and extending parallel with the axis of the mold and having a cam-surface, and a plunger adapted to engage such cam-surface, substantially as and for the purpose described.

In testimony that we claim the foregoing we have hereunto set our hands.

CHARLES H. PALMER.
CURTIS FENTON.

Witnesses to signature of Charles H. Palmer:
   H. W. HARRIS,
   T. F. CLEVELAND.
Witnesses to signature of Curtis Fenton:
   TOM F. PALMER,
   B. C. ROSS.